April 19, 1932.   A. L. HESS   1,855,172
CONVERTIBLE BICYCLE
Original Filed July 13, 1929   4 Sheets-Sheet 1

INVENTOR
Albert Laurance Hess
BY
Westall and Wallace
ATTORNEYS

April 19, 1932. A. L. HESS 1,855,172
CONVERTIBLE BICYCLE
Original Filed July 13, 1929 4 Sheets-Sheet 3

INVENTOR
Albert Laurance Hess
BY
Westall and Wallace
ATTORNEYS

April 19, 1932.  A. L. HESS  1,855,172
CONVERTIBLE BICYCLE
Original Filed July 13, 1929  4 Sheets-Sheet 4

INVENTOR
Albert Laurance Hess
BY Westall and Wallace
ATTORNEYS

Patented Apr. 19, 1932

1,855,172

UNITED STATES PATENT OFFICE

ALBERT LAURANCE HESS, OF LOS ANGELES, CALIFORNIA, ASSIGNOR TO CYCLETOW CORPORATION, LTD., OF LOS ANGELES, CALIFORNIA, A CORPORATION OF CALIFORNIA

CONVERTIBLE BICYCLE

Application filed July 13, 1929, Serial No. 378,096. Renewed November 10, 1930.

This invention relates to a bicycle convertible into a tricycle. The stability of a bicycle is maintained by steering to hold the centre of gravity in proper position, while a tricycle is stable because of its three point support. In many instances, bicycles are advantageous as a vehicle for transport to certain points and it is then desirable to tow the vehicle back. A particular instance is that wherein automobile service stations find it necessary to send a service man to drive a car from a distant point to the service station. Motorcycles are commonly used for this purpose and under the present practice, two men are sent from the service station, one to drive the car on return and the other to drive the motorcycle. Such practice is uneconomical as only one man is needed for actual work to be performed in driving the automobile. The present invention has for its primary object the provision of a bicycle such as a motorcycle with an attachment to convert it into a tricycle so that it may be towed behind an automobile or like vehicle. To this end I have provided foldable arms carrying tricycle wheels which may be positioned in inoperative position out of the way so that the vehicle may be operated as a bicycle and in open or operative position of the tricycle wheels to afford a tricycle which may be towed. In addition to the broader objects of this invention, there are certain details of structure contributing to simplicity and economy of construction and ease of manipulation in converting the vehicle from a bicycle into a tricycle or vice versa.

These objects together with other objects and corresponding accomplishments are obtained by means of the embodiment of my invention illustrated in the accompanying drawings, in which.

Referring more particularly to the drawings, a motorcycle of standard construction is generally indicated by 18 and has the usual frame 19 supported on a driving wheel 20 at its rear end and having a forked steering member 21 at its forward end supported on a wheel 22 and provided with handle bars 23. The frame carries a motor 24 with usual accessories and transmission mechanism and a saddle or operator's seat 25. As the details of the motorcycle are not pertinent to the present invention, they will not be described further.

Secured to the rear of frame 19 and straddling the rear wheel is a plate 30 of inverted U-form and suitably reinforced for rigidity. Attached to each leg of this plate is a pair of eyes or brackets 31 having pins 32 secured therein. An arm 33 is mounted at its inner end on pin 32 and is arranged to be swung thereon, the pin 32 forming a pivotal axis for the arm. Pivotally secured in the outer end of arm 33 is a steering knuckle 35, having a spindle 36 with wheels 37 journalled thereon. By referring to Figs. 1 and 3 it will be noted that pin 32 is considerably inclined from the vertical; thus when arm 33 is swung about it, wheel 37 at its outer end will be raised or lowered.

Figure 10:
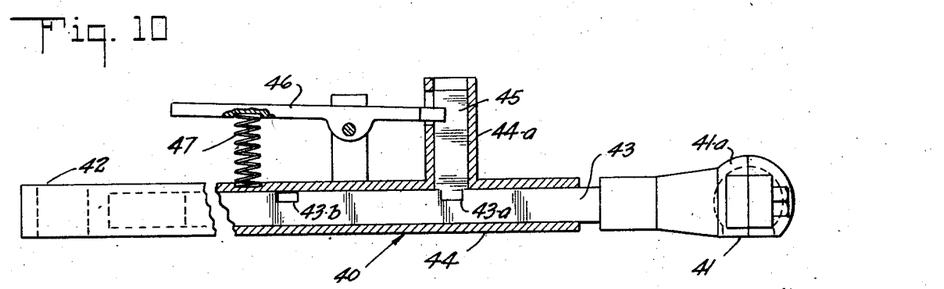
Fig. 10 is an elevation partly in section of one of the tie rods.
Figure 11:
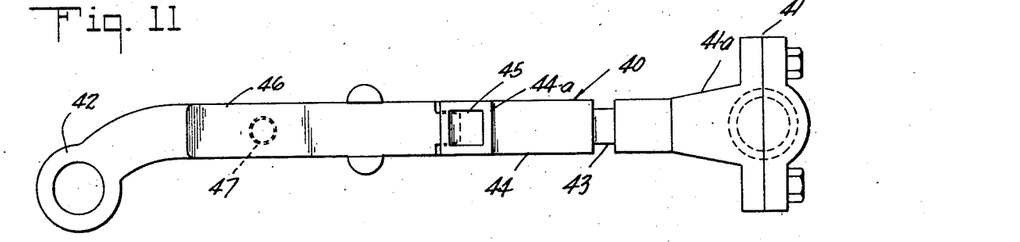
Fig. 11 is a plan view of the rod shown in Fig. 10.

Steering knuckle 35 has a steering arm 38 secured to it and arranged to swing it together with wheel 37 about the knuckle pin 35—a. A tie rod 40 is attached to arm 38 by a ball and socket joint 41 and has an eye 42 at its other end mounted on pin 32. By referring to Figs. 10 and 11, it will be seen that this tie rod is of telescopic construction. Socket member 41—*a* of ball and socket joint 41 is provided with a long shank 43. Eye 42 is formed at the end of a hollow section 44 adapted to have shank 43 slide therein. They are preferably square or rectangular, to prevent rotation of one relative to the other. Shank 43 is provided with notches 43—*a* and 43—*b* and a detent 45 arranged to engage either of these is mounted in a boss 44—*a* on section 44. Pivoted on member 44 adjacent the boss is a thumb lever 46 having one end engaging a notch in detent 45 and the other engaging a compression spring 47. The arrangement is such that the detent is normally urged into engagement with one of the notches by the spring 47, thus preventing relative movement of parts 43 and 44 but may be disengaged and such movement permitted when desired by depressing the outer end of lever 46.

Figures 5, 8, 9:
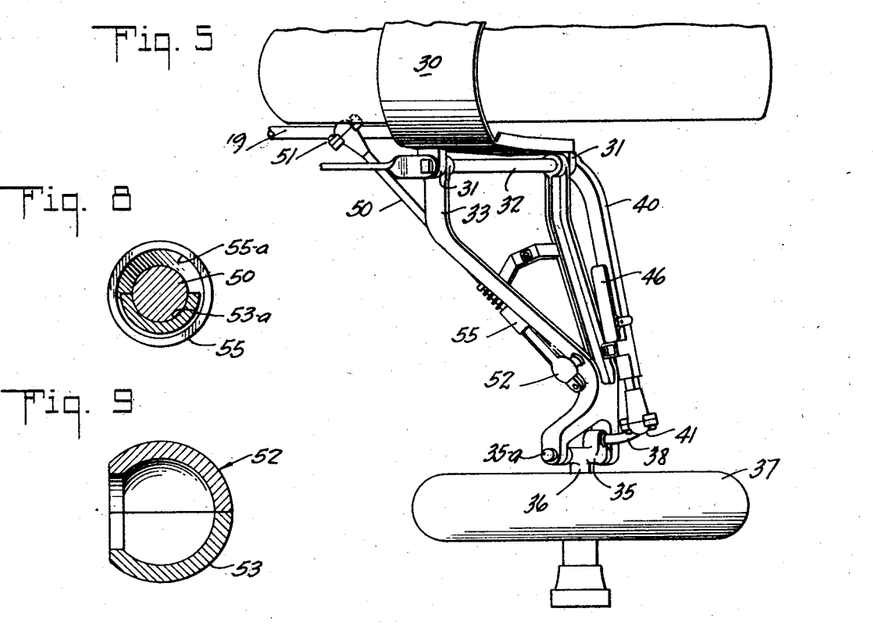
Fig. 5 is a fragmentary plan view on an enlarged scale as seen on line 5—5 of Fig. 1.
Figs. 8 and 9 are sections on an enlarged scale as seen on correspondingly numbered lines in Fig. 6.
Figure 6:
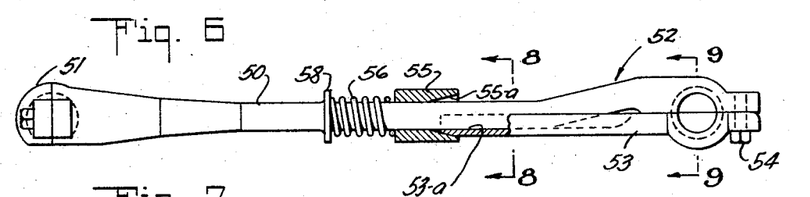
Figs. 6 and 7 are details of the strut rods.
Figure 7:
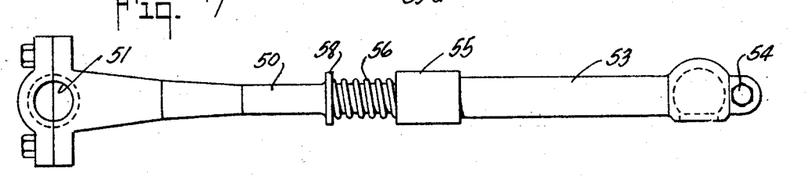

Secured to the arm 33 near its outer end is the ball member 33—*a* of a ball and socket joint, and a similar ball 33—*b* is secured at a point somewhat nearer the pin 32. A strut rod 50 has one end attached by a ball and socket joint 51 to the frame 19 of the motorcycle, and has its other end provided with a socket clamp 52 of special construction adapted to embrace either ball 33—*a* or 33—*b*. Figs. 6–9 inclusive show the details of the strut rod. By referring to these figures it will be noted that socket clamp 52 is split in the plane of the axis of the shank of the ball it is to embrace. Half of the socket is formed integral with the rod and half is formed in a cap 53 which is pivotally secured to the rod by a bolt or pin 54. Cap 53 has a channel shaped extension 53—*a* adapted to embrace rod 50, as best shown in Fig. 8 and arranged to be held in that position by a sleeve 55 sliding on rod 50 and having part of its bore tapering indicated by 55—*a*. A compression spring 56 is mounted on rod 50 between a shoulder 58 and sleeve 55 and forces the tapered bore 55—*a* over the end of channel 53—*a*, holding it firmly against rod 50.

When it is desired to disengage the socket from one of the ball members, sleeve 55 is moved against the spring a sufficient distance to clear the end of cap 53 which is then moved away from the rod 50 a sufficient distance to permit it to be swung about bolt 54 and release the ball. In securing it to a ball, the reverse procedure would of course be followed.

The draw bar by which the machine may be towed is illustrated in Figs. 1, 12, 13 and 14, and consists of a tubular member 60 pivotally secured to a fork 61 which is attached to the steering member 21 of the frame. The lower end bar 60 is adapted to receive the shank 62 of a swivel connection 63 and have it held therein by a pin 65. The body 64 of the swivel connection is arranged so that it turns on the shank and is pinned to a universal block 66, which is in turn pinned to the hook body 68. This is provided with suitable resilient padding 69, such as leather, on its inner face and has a bar 70 pivotally hung from the top. Bar 70 may be provided with a leather or rubber covering and is fastened at its lower end by a link 71 and an over centre handle 72. The hook 68 is adapted to embrace a bumper bar 73.

Figures 12, 14:
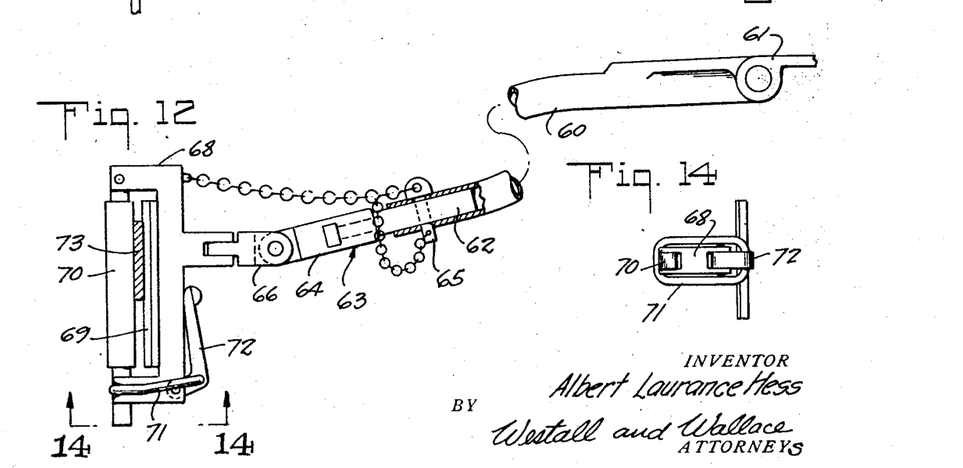
Fig. 12 is an elevation of the draw bar and hook attached to a bumper on an automobile.
Fig. 14 is a detail of the hook as seen on line 14—14 in Fig. 12.
Figure 13:
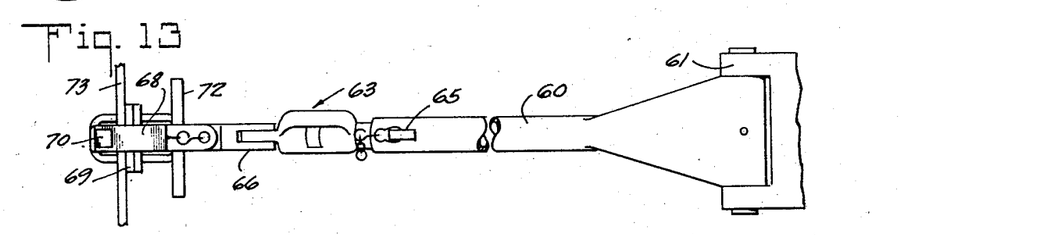
Fig. 13 is a plan view of the draw bar.

The hook is of sufficient height to accommodate all varieties of bumpers, and variations in thickness are taken care of by the spring of link 71 and the resilient pad 69 and covering of bar 70. These also prevent rattles and the possibility of scratching the bumper. When the tow bar is not in use, pin 65 is removed and the hook and connected parts are taken off and put in any convenient receptacle on the machine, bar 60 being fastened to the front mud guard of the machine by strap 75.

Figure 1:
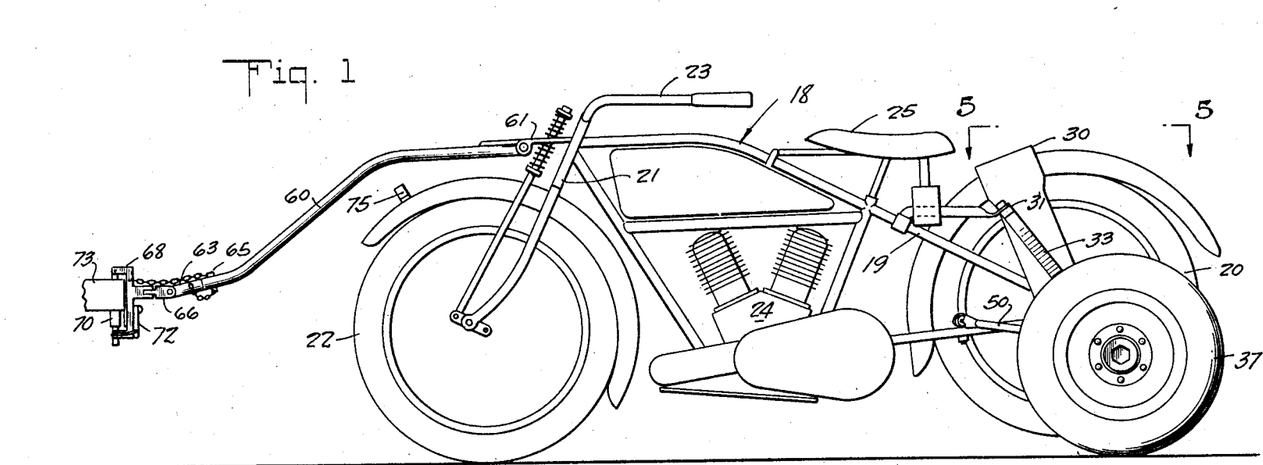
Fig. 1 is a side elevation of a preferred form of my convertible bicycle arranged as a tricycle with the arms in open position and attached to the rear of a vehicle for towing.
Figure 2:
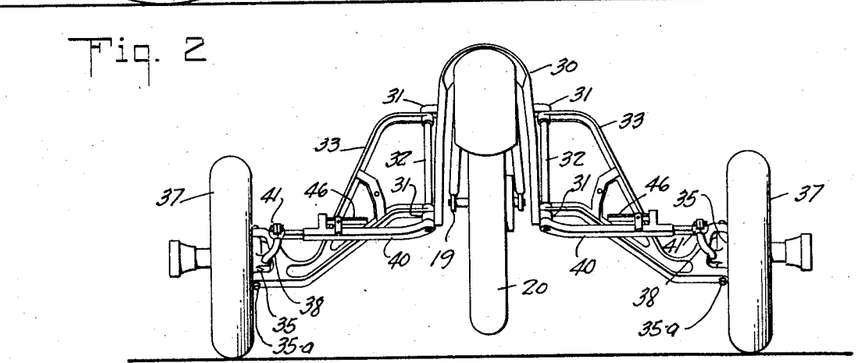
Fig. 2 is a rear elevation of the bicycle as shown in Fig. 1.
Figure 3:
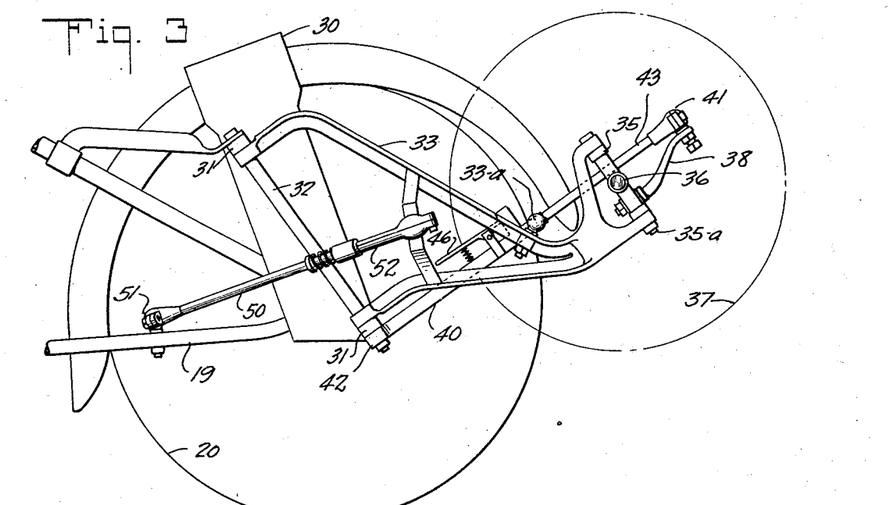
Fig. 3 is a side elevation on an enlarged scale of the rear portion of the bicycle, arranged as a bicycle, the arms being in folded position.
Figure 4:
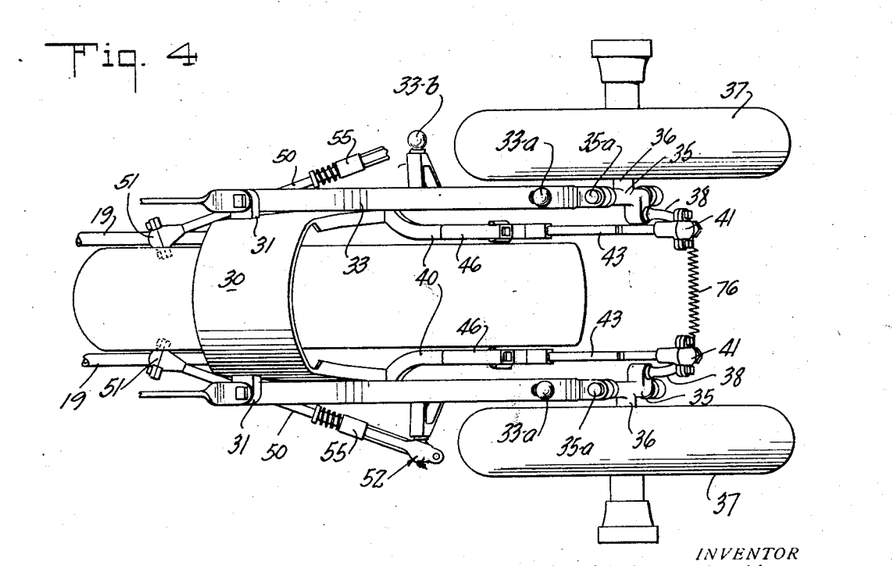
Fig. 4 is a plan view of the mechanism as shown in Fig. 3.

Assuming that the bicycle is being towed, all parts will then be as illustrated in Figs. 1, 2 and 5, wheels 37 and 22 being on the ground and driving wheel 20 off the ground and not revolving, in effect a tricycle. When it is desired to convert it to a bicycle, the machine is held upright by any suitable mechanism, such arrangements being well known in the art. One of the detents 45 is released and the clamp on the strut rod 50 is released (on the same side of the machine). Arm 33 is then swung backwards and inwardly, and knuckle 35 turned on pin 35—*a*, bringing wheel 37 parallel to the arm. Wheel 37 will of course be raised from the ground due to the inclination of pin 32. When the arm becomes parallel to the frame of the machine, clamp 52 of strut rod 50 is clamped about ball 33—*b*. At the same time notch 43—*b* will be in position to be engaged by detent 45, which will hold wheel 37 also parallel to the frame. Similar procedure is then followed for the other side, after which all parts are as shown in Figs. 3 and 4. Steering arms 38 may be connected by a tension spring 76 (Fig. 3) to hold the parts against rattling. The tow bar will have been disconnected as described in the preceding paragraph.

What I claim is:—

1. A convertible bicycle comprising a frame having bicycle wheels in line, a pair of arms, one pivotally mounted on each side of said frame to be swung into folded position against said frame or into open position outstanding from said frame, a pair of knuckles having wheel spindles mounted on said arms at the outer ends thereof, wheels journalled on said spindles, a pair of telescopic tie rods, one connected to each knuckle and anchored at its other end to said frame for positioning said tricycle wheels in travelling alinement with said bicycle wheels when said arms are in open position and to lie flat with relation to said frame in closed position of said arms, means to lock said tie rods against extension or contraction with said tricycle wheels in either of said positions, said arms being mounted on pivotal axes inclined so as to position said tricycle wheels at a lower ground engaging position than one of said bicycle wheels when said arms are in open position and at a higher than ground engaging position when said arms are in folded position whereby to provide a bicycle with said arms in folded position and a tricycle with said arms in open position, and means to lock said arms in either folded or open position.

2. A convertible bicycle comprising a frame having bicycle wheels in line, a pair of arms, one pivotally mounted on each side of said frame to be swung into folded position against said frame or into open position outstanding from said frame, a pair of tricycle wheels journalled on said arms at the outer ends thereof, said arms being mounted on pivotal axes inclined so as to position said tricycle wheels at a lower ground engaging position than one of said bicycle wheels when said arms are in open position and at a higher than ground engaging position when said arms are in folded position whereby to provide a bicycle with said arms in folded position and a tricycle with said arms in open position, a pair of strut rods, each secured at one end to said frame and having a clamp for attachment to a corresponding arm at the other end, means on said arms for securing of said strut rods thereto in two positions, one for maintaining said arms in open position and the other for maintaining said arms in closed position.

3. A convertible bicycle comprising a frame having bicycle wheels in line, a pair of arms, one pivotally mounted on each side of said frame to be swung into folded position against said frame or into open position outstanding from said frame, a pair of knuckles having wheel spindles mounted on said arms at the outer ends thereof, wheels journalled on said spindles, a pair of tie rods, one connected to each knuckle and anchored at its other end to said frame for positioning said tricycle wheels in travelling alinement with said bicycle wheels when said arms are in open position and to lie flat with relation to said frame in closed position of said arms, said arms being mounted on pivotal axes inclined so as to position said tricycle wheels at a lower ground engaging position than one of said bicycle wheels when said arms are in open position and at a higher than ground engaging position when said arms are in folded position whereby to provide a bicycle with said arms in folded position and a tricycle with said arms in open position, a pair of strut rods, each strut rod being secured at one end to said frame and having a clamp for attachment to a corresponding arm at the other end, means on said arms for securing said strut rods thereto in two positions, one for maintaining said arms in open position and the other for maintaining said arms in closed position.

4. A convertible bicycle comprising a frame having bicycle wheels in line, a pair of arms, one pivotally mounted on each side of said frame to be swung into folded position against said frame or into open position outstanding from said frame, a pair of knuckles having wheel spindles mounted on said arms at the outer ends thereof, wheels journalled on said spindles, a pair of telescopic tie rods, one connected to each knuckle and anchored at its other end to said frame for positioning said tricycle wheels in traveling alinement with said bicycle wheels when said arms are in open position and to lie flat with relation to said frame in closed position of said arms, means to lock said tie rods against expansion or contraction with said tricycle wheels in either of said positions, said arms being mounted on pivotal axes inclined so as to position said tricycle wheels at a lower ground engaging position than one of said bicycle wheels when said arms are in open position and at a higher than ground engaging position when said arms are in folded position whereby to provide a bicycle with said arms in folded position and a tricycle with said arms in open position, a pair of strut rods, each secured at one end to said frame and having a clamp for attachment to a corresponding arm at the other end, means on said arms for securing said strut rods thereto in two positions, one for maintaining said arms in open position and the other for maintaining said arms in closed position.

5. A convertible bicycle comprising a frame having bicycle wheels in line, an arm pivotally mounted on a side of said frame to be swung into folded position against said frame or in open position outstanding from said frame, a knuckle having a wheel spindle mounted on said arm at the outer end thereof, a tricycle wheel journalled on said spindle, a tie rod connected to said knuckle and anchored at its other end to said frame for positioning said tricycle wheel in traveling alinement with said bicycle wheels when said arm is in open position and to lie flat with relation to said frame in closed position of said arm, said arm being mounted on a pivotal axis inclined so as to position said tricycle wheel at ground engaging position when said arm is in open position and at a higher than ground engaging position when said arm is in folded position whereby to provide a bicycle with said arm in folded position and a tricycle with said arm in open position, and means to lock said arm in either folded or open position.

6. A convertible bicycle comprising a frame having bicycle wheels in line, an arm pivotally mounted on a side of said frame to be swung into folded position against said frame or into position outstanding from said frame, knuckles having a wheel spindle mounted on said arm at the outer end thereof, a tricycle wheel journalled on said spindle, an extensible tie rod connected to said knuckle and anchored at its other end to said frame for positioning said tricycle wheel in travelling alinement with said bicycle wheels when said arm is in open position and to lie flat with relation to said frame in closed position of said arm, means to lock said tie rod against extension or contraction with said tricycle wheel in either of said positions, said arm being mounted on a pivotal axis inclined so as to position said tricycle wheel at ground engaging position when said arm is in open position and at a higher than ground engaging position when said arm is in folded position whereby to provide a bicycle with said arm in folded position and a tricycle with said arm in open position, means to lock said arm in either folded or open position.

7. A convertible bicycle comprising a frame having bicycle wheels in line, an arm pivotally mounted on a side of said frame to be swung into folded position against said frame or into open position outstanding from said frame, a tricycle wheel journalled on said arm at the outer end thereof, said arm being mounted on a pivotal axis inclined so as to position said tricycle wheel at ground engaging position when said arm is in open position and at a higher than ground engaging position when said arm is in folded position whereby to provide a bicycle with said arm in folded position and a tricycle with said arm in open position, a strut rod secured at one end to said frame and having a clamp for attachment to said arm at the other end, means on said arm for securing thereto of said strut rod in two positions, one for maintaining said arm in open position and the other for maintaining said arm in closed position.

8. A convertible bicycle comprising a frame having bicycle wheels in line, an arm pivotally mounted on a side of said frame to be swung into folded position against said frame or into open position outstanding from said frame, a knuckle having a wheel spindle mounted on said arm at the outer end thereof, a tricycle wheel journalled on said spindle, a tie rod connected to said knuckle and anchored at its other end to said frame for positioning said tricycle wheel in travelling alinement with said bicycle wheels when said arm is in open position and to lie flat with relation to said frame in closed position of said arm, said arm being mounted on a pivotal axis inclined so as to position said tricycle wheel at ground engaging position when said arm is in open position and at a higher than ground engaging position when said arm is in folded position whereby to provide a bicycle with said arm in folded position and a tricycle with said arm in open position, a strut rod secured at one end to said frame and having a clamp for attachment to said arm at the other end, means on said arm for securing said strut rod thereto in two positions, one for maintaining said arm in open position and the other for maintaining said arm in closed position.

9. A convertible bicycle comprising a frame having bicycle wheels in line, an arm pivotally mounted on a side of said frame to be swung into folded position against said frame or into open position outstanding from said frame, a knuckle having a wheel spindle mounted on said arm at the outer end thereof, a tricycle wheel journalled on said spindle, an extensible tie rod connected to said knuckle and anchored at its other end to said frame for positioning said tricycle wheel in travelling alinement with said bicycle wheels when said arm is in open position and to lie flat with relation to said frame in closed position of said arm, means to lock said tie rod against extension or contraction with said tricycle wheel in either of said positions, said arm being mounted on a pivotal axis inclined so as to position said tricycle wheel at ground engaging position when said arm is in open position, and at a higher than ground engaging position when said arm is in folded position whereby to provide a bicycle with said arm in folded position and a tricycle with said arm in open position, a strut rod secured at one end to said frame and having a clamp for attachment to said arm at the other end, means on said arm for securing said strut rod thereto in two positions, one for maintaining said arm in open position and the other for maintaining said arm in closed position.

10. An attachment for a motorcycle comprising a wheel support adapted to straddle the driving wheel of the cycle, a pair of brackets pivotally secured to said support, one on each side of said driving wheel, an auxiliary wheel journaled on each bracket, said brackets being movable on said pivots to one position in which said auxiliary wheels engage the ground when said cycle is upright and to a second position in which said wheels are in a position above the ground close to and substantially parallel to the driving wheel.

11. An attachment for a motorcycle comprising a wheel support adapted to straddle the driving wheeel of the cycle, a pair of brackets pivotally secured to said support, one on each side of said driving wheel, an auxiliary wheel journaled on each bracket, said brackets being movable on said pivots to one position in which said auxiliary wheels engage the ground when said cycle is upright and to a second position in which said wheels are in a position above the ground close to and substantially parallel to the driving wheel, and means for securing said brackets in either of said two positions.

12. An attachment for a bicycle comprising a wheel support adapted to straddle the driving wheel of the bicycle, a pair of brackets pivotally secured to said support, one on each side of said driving wheel, a knuckle pivotally secured to the outer end of each bracket, an auxiliary wheel journaled on each knuckle, said brackets being movable on said pivots to one position in which said auxiliary wheels engage the ground when said bicycle is upright and to a second position in which said wheels are in a position above the ground, a tie rod for each knuckle connecting said knuckle with the support whereby said auxiliary wheels are aligned substantially parallel with said driving wheel in either position of said brackets.

13. An attachment for a bicycle comprising a wheel support adapted to straddle the driving wheel of the bicycle, a pair of brackets pivotally secured to said support, one on each side of said driving wheel, a knuckle pivotally secured to the outer end of each bracket, an auxiliary wheel journaled on each knuckle, said brackets being movable on said pivots to one position in which said auxiliary wheels engage the ground when said bicycle is upright and to a second position in which said wheels are in a position above the ground, a tie rod for each knuckle connecting said knuckle with the support whereby said auxiliary wheels are aligned substantially parallel with said driving wheel in either position of said brackets and means for adjusting the length of said tie rod.

14. In a device for supporting a motorcycle in an upright position, a pair of substantially flat brackets each having a substantially great width relative to its length, means pivotally securing one of said brackets along its width to the frame of said cycle on one side of the driving wheel thereof, means pivotally securing the other of said brackets along its width to the frame of said cycle on the opposite side of said driving wheel, an auxiliary wheel journaled to the outer end of each bracket and movable with the bracket to a plurality of positions including one position in which the auxiliary wheels engage the ground when the cycle is upright, and another position in which the auxiliary wheels are above the ground retracted toward each other and both substantially parallel to the driving wheel.

15. In a device for supporting a motorcycle in upright position, a pair of substantially flat brackets each having a substantially great width relative to its length, means pivotally securing one of said brackets along its width to the frame of said cycle on one side of the driving wheel, the axis of said pivotal means being inclined to the vertical, means pivotally securing the other of said brackets along its width to the frame of said cycle on the opposite side of said driving wheel, said pivotal securing means extending parallel to said first named pivotal securing means, an auxiliary wheel journaled to the outer end of each bracket and movable with the bracket to a plurality of positions including one position in which the auxiliary wheels engage the ground when the cycle is upright, and another position in which the auxiliary wheels are above the ground retracted toward each other and both substantially parallel to the driving wheel.

16. In a device for supporting a motorcycle in an upright position, a pair of substantially flat brackets each having a substantially great width relative to its length, means pivotally securing one of said brackets along its width to the frame of said cycle on one side of the driving wheel thereof, means pivotally securing the other of said brackets along its width to the frame of said cycle on the opposite side of said driving wheel, an auxiliary wheel journaled to the outer end of each bracket and movable with the bracket to a plurality of positions including one position in which the auxiliary wheels engage the ground when the cycle is upright, another position in which the auxiliary wheels are above the ground retracted toward each other and both substantially parallel to the driving wheel, and a brace for each of said brackets secured between the frame of the cycle and the associated bracket for holding said bracket in position to engage the auxiliary wheel with the ground.

17. In combination with a motorcycle, auxiliary wheels on opposite sides thereof, and means mounting said wheels on the cycle arranged for movement of the wheels toward each other and into elevated position close together maintained in substantially vertical planes, for movement into extended position supporting one wheel of the motorcycle above the ground and mutually spaced apart sufficiently for supporting and balancing the motorcycle while being towed.

18. In combination with a motorcycle, a pair of auxiliary wheels and means mounting them on the cycle on opposite sides thereof, said means being arranged for retracting the wheels toward each other and upwardly close together in substantially vertical positions, said means being also constructed for swinging the auxiliary wheels outwardly from the motorcycle frame into contact with the ground mutually spaced apart sufficiently to balance the motorcycle while being towed and arranged to support one wheel of the motorcycle off the ground.

19. In combination with a motorcycle, a pair of auxiliary wheels and means mounting them on opposite sides of the motorcycle, said means being constructed for retracting and elevating the wheels toward each other and close together, said means being constructed for swinging said auxiliary wheels outwardly from the motorcycle frame and to coact with said wheels to lift one wheel of the motorcycle off the ground by continuation of said swinging movement.

20. In combination with a motorcycle, a pair of auxiliary wheels and means mounting them on opposite sides of the motorcycle, said means being constructed for retracting and elevating said wheels toward each other and into a position close to the motorcycle frame, said means being also constructed for extending said wheels from retracted position outwardly from the motorcycle frame into contact with the ground and by further extension thereafter to force one wheel of the motorcycle upwardly from the ground.

21. In combination with a motorcycle, auxiliary wheels and means pivotally mounting them independently of each other on opposite sides of the cycle, said means being arranged for movement of the wheels toward each other into an elevated position close together and maintained in substantially vertical planes, and arranged for movement of the wheels into lowered extended position supporting one wheel of the motorcycle above the ground when the auxiliary wheels are mutually spaced apart sufficiently for supporting and balancing the motorcycle while being towed, said means being so arranged that when one auxiliary wheel is held in position contacting the ground simultaneously with the drive wheel the other wheel may be rotated about its pivot to cause the driving wheel to be elevated.

22. In combination with a motorcycle, auxiliary wheels and means pivotally mounting them independently of each other on opposite sides of the cycle, said means being arranged for movement of the wheels toward each other into an elevated position close together and maintained in substantially vertical planes, and arranged for movement of the wheels into lowered extended position supporting one wheel of the motorcycle above the ground when the auxiliary wheels are mutually spaced apart sufficiently for supporting and balancing the motorcycle while being towed, said means being so arranged that when one auxiliary wheel is held in position contacting the ground simultaneously with the drive wheel, the means for mounting the other auxiliary wheel on the cycle may be operated to cause the driving wheel to be elevated off the ground.

23. In combination with a motorcycle, a pair of auxiliary wheels and axles therefor, a pair of arms each respectively pivotally connected at its opposite ends with the motorcycle and with one of said axles along pivotal axes which extend longitudinally relatively to the cycle, and means operatively connected with each said axle and said cycle for holding each respective wheel substantially vertical and parallel to the cycle frame both when the wheel is lowered to the ground and when rotated upwardly along with said arm into proximity with the cycle frame.

24. In combination with a motorcycle, a pair of auxiliary wheels and axles therefor, a pair of arms each respectively pivotally connected at its opposite ends with the motorcycle and with one of said axles along pivotal axes which extend longitudinally relatively to the cycle, and means pivotally connected with each said axle on a similarly longitudinally extending axis and operatively connected with said cycle for holding its respective wheel vertical and parallel to the frame both when the wheel is contacting the ground and when rotated upwardly on said arm into proximity with the cycle frame.

25. In combination with a motorcycle, a pair of auxiliary wheels and axles therefor, a pair of arms each respectively pivotally connected at its opposite ends with the motorcycle and with one of said axles along pivotal axes which extend longitudinally relatively to the cycle, means operatively connected with each said axle and said cycle for holding each respective wheel substantially vertical and parallel to the cycle frame both when the wheel is lowered to the ground and when rotated upwardly along with said arm into proximity with the cycle frame, and means for locking said arms in lowered position downwardly rotated sufficiently to raise the motorcycle drive wheel off the ground.

26. In combination with a motorcycle, a pair of auxiliary wheels and axles therefor, and means for mounting them on opposite sides of the cycle, said means being pivotally connected with the motorcycle and with said axles along axes which extend longitudinally relatively to the cycle, and means for retaining each auxiliary wheel substantially vertically disposed parallel to the cycle frame both when contacting with the ground and when elevated close to the cycle frame by upward rotation of said mounting means.

27. In combination with a motorcycle, a pair of auxiliary wheels each provided with an axle and means for mounting them on opposite sides of the wheel, said mounting means being provided on each side of the cycle with two pivotal connections to the cycle, one above the other, and each extending horizontally of the cycle, the outer ends of said mounting means having two pivotal connections with each auxiliary wheel axle one above the other and both longitudinally extending relatively to the cycle, said means being arranged to hold the auxiliary wheels in vertical position both when contacting the ground and when elevated to retracted position close to the cycle frame.

28. In combination with a motorcycle having a drive wheel and auxiliary wheels on opposite sides thereof, means connecting the auxiliary wheels to the motorcycle arranged for locking the auxiliary wheels in retracted position elevated from the ground close to the drive wheel and in extended position holding the drive wheel off the ground and mutually spaced apart sufficiently to balance and support the motorcycle while being towed, said connecting means being arranged so that when both auxiliary wheels are contacting the ground further movement of one wheel about its pivot will cause elevation of the drive wheel.

29. In combination with a motorcycle, auxiliary wheels on opposite sides thereof, means connecting said wheels to the motorcycle for movement into elevated position close together, and for movement into extended position supporting one wheel of the motorcycle above the ground and mutually spaced apart sufficiently to balance and support the motorcycle while being towed, said means during said extending movement serving to lift said motorcycle wheel relatively to the auxiliary wheels.

In witness that I claim the foregoing I have hereunto subscribed my name this 6th day of July, 1929.

ALBERT LAURANCE HESS.